(12) United States Patent  
Cemke, Jr. et al.

(10) Patent No.: US 6,367,619 B1
(45) Date of Patent: Apr. 9, 2002

(54) CONVEYOR NOSE BAR (75) Inventors: James A Cemke, Jr., Germantown; Jeffrey A. Schumacher, Port Washington, both of WI (US)

(73) Assignee: Rexnord Corporation, Milwaukee, WI (US)

(*) Notice: Subject to any disclaimer, the term of this patent is extended or adjusted under 35 U.S.C. 154(b) by 0 days.

(21) Appl. No.: 09/615,236

(22) Filed: Jul. 13, 2000

(51) Int. Cl.7 ............................................. B65G 15/60
(52) U.S. Cl. ........................................ 198/841; 198/837
(58) Field of Search ................................ 198/837, 841

(56) References Cited

U.S. PATENT DOCUMENTS

| 3,491,873 A | * | 1/1970 | Fauth ..................... 198/841 X |
| 4,206,994 A | * | 6/1980 | Silverberg et al. ....... 198/841 X |
| 4,327,828 A |   | 5/1982 | Williams ..................... 18/729 |
| 4,492,304 A | * | 1/1985 | Geis ........................... 198/837 |
| 4,576,277 A |   | 3/1986 | Park et al. ................ 198/803.1 |
| 4,664,036 A |   | 5/1987 | Hajcak, Jr. ................ 104/172.2 |
| 5,164,777 A | * | 11/1992 | Agarwal et al. ........ 198/841 X |
| 5,217,103 A | * | 6/1993 | Umlauf ................... 198/841 X |
| 5,310,047 A | * | 5/1994 | Ledingham ................. 198/841 |
| 5,350,053 A |   | 9/1994 | Archer ........................ 198/525 |
| 5,597,062 A |   | 1/1997 | Biwer ......................... 198/600 |
| 5,692,597 A | * | 12/1997 | Ferguson ..................... 198/841 |
| 5,799,780 A |   | 9/1998 | Steeb, Jr. et al. ........... 198/823 |
| 5,860,512 A |   | 1/1999 | Gianvito et al. ............ 198/841 |
| 5,904,240 A | * | 5/1999 | Pax et al. ................ 198/837 X |
| 5,967,296 A |   | 10/1999 | Dolan ........................ 198/853 |

FOREIGN PATENT DOCUMENTS

| EP | 0243731 A1 | 11/1987 | ........... B65G/17/06 |
| EP | 0705776 A1 | 4/1996 | ........... B65G/47/66 |
| GB | 690 858 A | 4/1953 | |
| SU | 538142 | * 3/1977 | .................. 198/841 |

OTHER PUBLICATIONS

Intralox, Design Guidelines, p. 3–15, Sep. 1998.
Intralox, Series 1100 Product Line, p. 2–55, Sep. 1998.

* cited by examiner

*Primary Examiner*—James R. Bidwell
(74) *Attorney, Agent, or Firm*—Quarles & Brady LLP (57) ABSTRACT

A conveyor which includes a conveyor frame for supporting a chain for slidable movement thereon, and having an end. A chain is slidably supported by the frame and wraps around the end. A nose bar is mounted to the conveyor end, and has an edge extending away from the frame. An insert is mounted to the nose bar edge and has wear material slidably engaging the chain.

35 Claims, 5 Drawing Sheets

CONVEYOR NOSE BAR

CROSS REFERENCES TO RELATED APPLICATIONS

Not Applicable

STATEMENT REGARDING FEDERALLY SPONSORED RESEARCH

Not Applicable

BACKGROUND OF THE INVENTION

This invention relates to conveyors, and more particularly to a nose bar which supports a conveyor chain wrapped around an end of a conveyor frame.

Conveying equipment is used in various manufacturing facilities for transporting articles. Known conveying equipment includes belts or chains that are supported on conveyor frames, and that are constructed of chain links or modules interconnected by chain pins in an endless loop. The articles are often transferred from one conveying section to a second conveying section.

Small articles, or articles which are susceptible to tipping, are difficult to transfer between conveyor sections because of the discontinuity, or gap, between adjacent sections. The articles can get hung up between the conveyor sections, or tip over. Transfer plates are often used to facilitate the transfer of articles from one conveying section to an adjacent conveying section. Depending upon the size of the transfer plates relative to the size of the contact surface of the article conveyed, the transfer plate can form a "dead spot" causing the conveyed article to hang up on the transfer plate. The sudden change in motion caused by the article hanging up on the transfer plate can cause the article to tip over.

In order to minimize the discontinuity between conveyor sections, small pitched chain relative to the article contact surface is used. The small pitched chain wraps around the end of a conveyor section having a small radius to allow close spacing of adjacent conveyor sections which minimizes the gap therebetween and associated problems. When wrapping the chain around the conveyor end to minimize the gap between adjacent conveyors, the conveyor ends must be adapted to accommodate the chain. In a known conveyor, a rotating member, such as a roller on a shaft, at the conveyor end rotates as the chains move around the end and through the gap. The shaft, however, can be bent when excessive loads are placed on the conveyor chain, and the moving components can be a source of failure increasing maintenance costs. Furthermore, a small radius conveyor end creates space constraints for rollers and bearings.

In another known conveyor, a non-rotating member is mounted to the conveyor end, and the chain slides around the non-rotating member. This non-rotating member is a solid wear bar machined to a desired profile. The machining marks on the wear bar leaves an undesirable surface finish, and the machining can result in dimensional inconsistencies. For these reasons, the hard wear bar can cause excessive wear of the chain, and high chain tension due to friction. Furthermore, when using a non-rotating member, the wear bar is typically mounted to the conveyor end using brackets. This prevents a 180° wrap of the chain around the conveyor end, increasing the thickness of the conveyor frame.

SUMMARY OF THE INVENTION

The present invention provides a conveyor which includes a conveyor frame for supporting a chain for slidable movement thereon, and having an end. A chain is slidably supported by the frame and wraps around the end. A nose bar is mounted to the conveyor end, and has an edge extending away from the frame. A wear material insert is mounted to the nose bar edge, and slidably engages the chain.

A general objective of the present invention is to provide a conveyor having nose bar having a wear material which can be easily replaced and optimized for wear and low friction. This objective is accomplished by providing the nose bar with an insert formed from a wear material which can be optimized for a particular conveyor chain for wear and low friction. The insert can be replaced without disassembling the conveyor or chain.

Another object of the present invention is to provide a nose bar which allows a chain wrap of 180°. This objective is accomplished by providing a nose bar body formed from two halves which can clamp onto an end of the conveyor.

The foregoing and other objects and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENT

Figure 1:
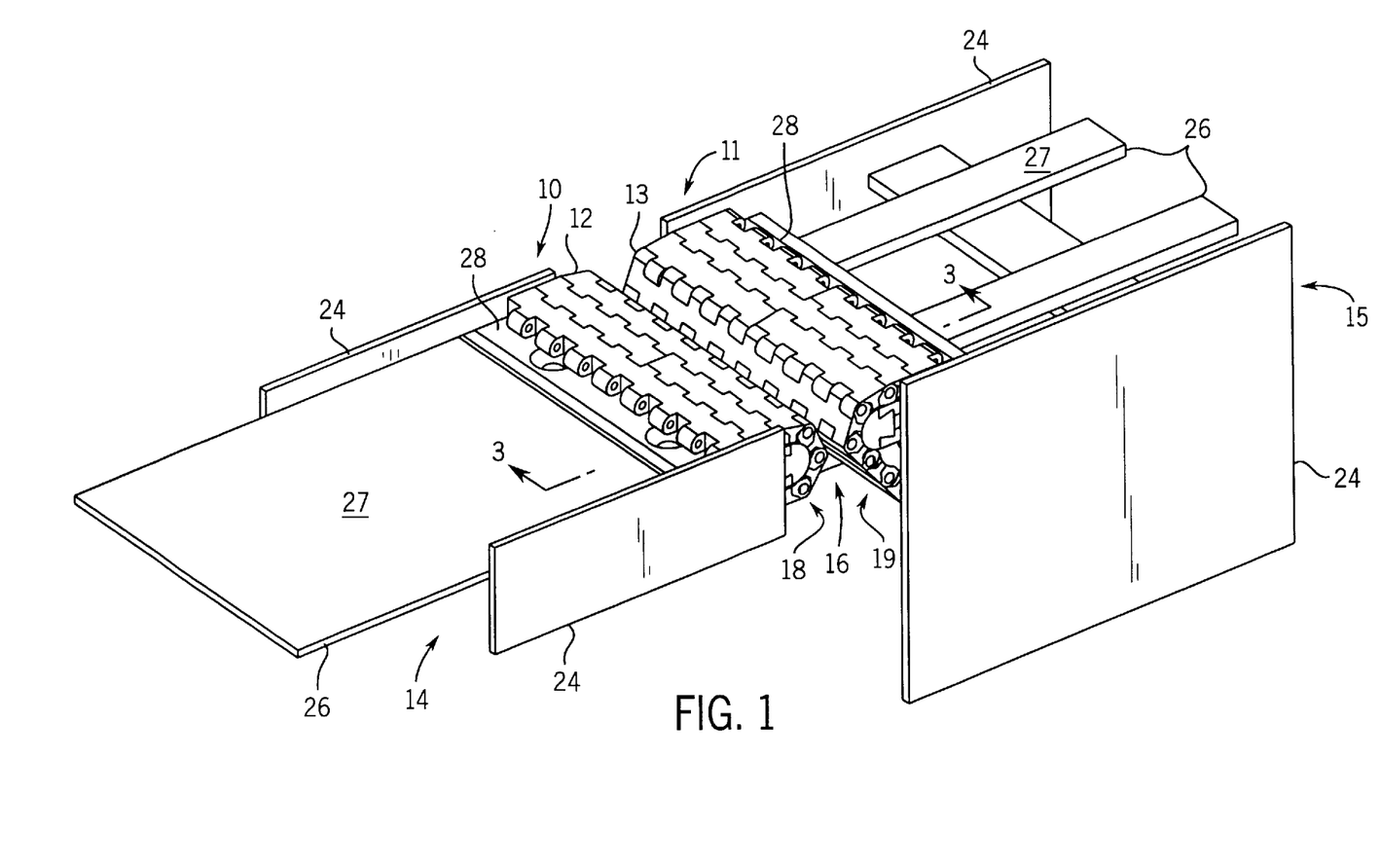
FIG. 1 is a perspective view of conveyor sections incorporating the present invention.
Figure 2:
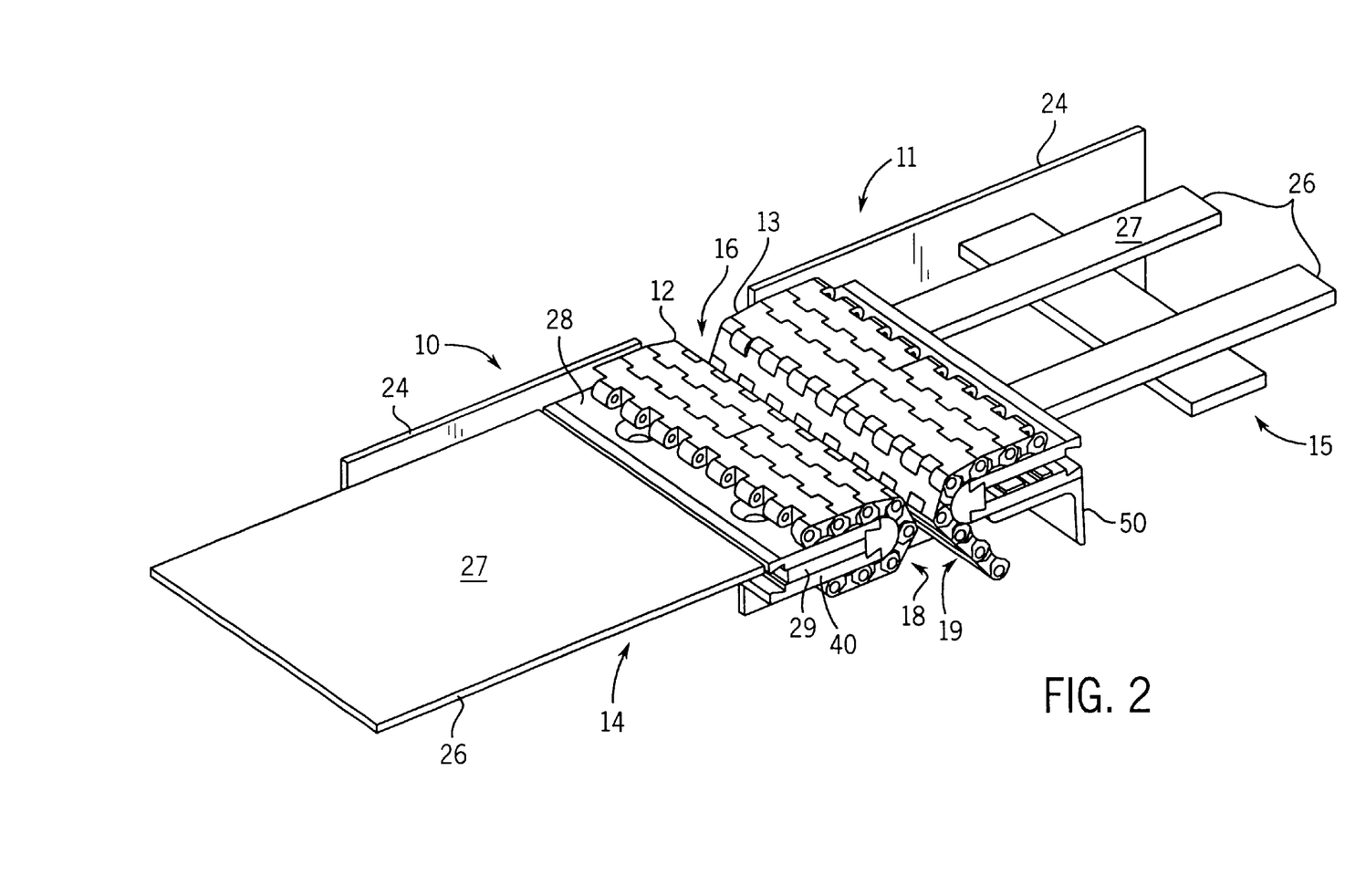
FIG. 2 is a perspective view of FIG. 1 with some side rails removed.
Figure 3:
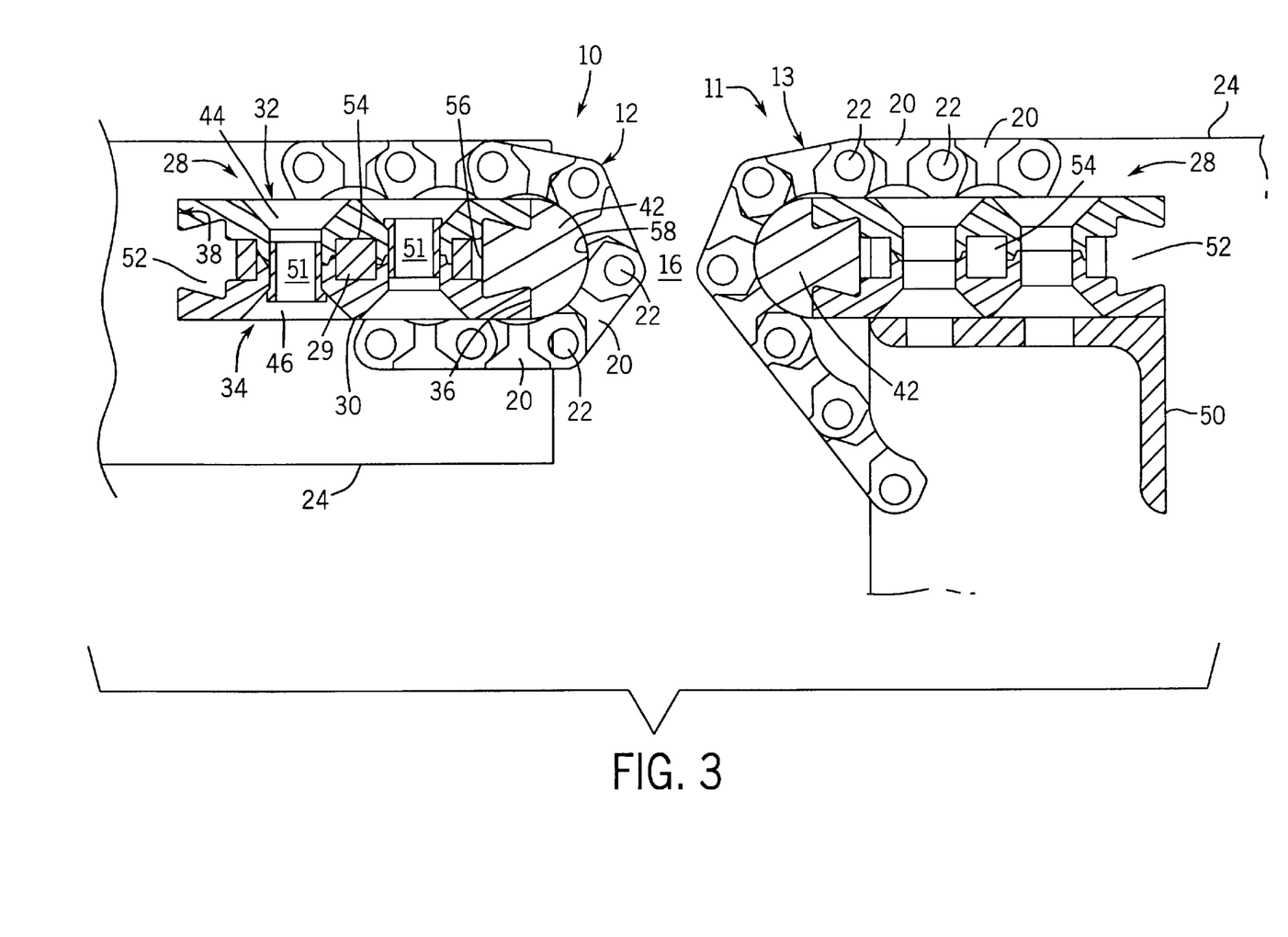
FIG. 3 is a cross sectional view along line 3—3 of FIG. 1.

A conveyor system, shown in FIGS. 1–3, includes adjacent conveyor sections 10, 11 positioned in an end to end relationship. Each conveyor section 10, 11 transports an article (not shown) on a chain 12, 13 supported by a frame 14, 15. The articles are transferred between the sections 10, 11 across a gap 16 formed between adjacent section ends 18, 19. Although adjacent conveyor sections 10, 11 are described, the gap 16 can be formed between a single conveyor section and another piece of equipment, such as a lift, processing apparatus, perpendicular transfers, transfers across transfer plates or the like, without departing from the scope of the present invention.

The conveyor chain 12, 13 can be any suitable construction, such as chains sold by Rexnord Corporation, Milwaukee, Wis. Suitable chains available from Rexnord include Model No. 5935 chain and Model No. 6938 chain, both of which have a ¾ inch pitch, Rexnord Model 1500 series chain having a 15 mm pitch, and the like. The chain 12, 13 is formed from individual chain modules or links 20 arranged in intermeshing rows. The adjacent rows of chain links 20 are interconnected by elongated chain pins 22 to form an endless loop having an upper run that provides an article supporting surface on which the article is conveyed. Preferably, the chain 12, 13 has a pitch of 1 inch or less to allow close spacing of adjacent conveyors.

Conveyor section 10 will now be described with the understanding that conveyor section 11 is similarly constructed unless a difference is noted. Conveyor section 10 includes the frame 14 having opposite side rails 24 and a carry way 26 interposed between the side rails 24. The carry way 26 has a supporting surface 27 which supports the chain 12. The endless chain 12 loop slides along the supporting surface 27, and wraps around a nose bar 28 mounted to the frame end 18 to pass through the gap 16. In the conveyor section 10, a support bar 29 extends from the between the side rails 24 at the frame end 18 for mounting the nose bar 28, as described in further detail below. Although a support bar 29 is disclosed, as further described herein, a support bar 29 for mounting the nose bar 28 thereon is not required to practice the invention.

The side rails 24 extend substantially perpendicular to the carry way supporting surface 27, and guide the chain 12 on the carry way 26. The side rails 24 can be mounted to the carry way 26 using methods known in the art such as bolts and the like, or independently mounted to a floor or to legs (not shown) supporting the carry way. Alternatively, for narrow chain, the side rails 24 can include chain supporting surfaces or wear strips which support the chain, and thus eliminates the carry way.

As best shown in FIG. 3, the nose bar 28 is mounted to the support bar 29, and extends laterally between the frame side rails 24 to support the chain 12 as it passes through the gap 16. The nose bar 28 includes an elongated body 30 having a top surface 32 and bottom surface 34 joined by a front edge 36 extending into the gap 16, an opposite rear edge 38, and ends 40.

A wear material insert 42 is mounted to the body front edge 36 for engaging the chain 12 as it loops around the conveyor frame end 18. Continuous engagement of the chain 12 with the wear material insert 42 wears the wear material away. When the chain 12 wears the wear material insert 42 down to a predetermined level, only the wear material insert 42 need be replaced, and not the entire nose bar 28. By providing a nose bar 28 having an easily replaceable wear material insert 42, the cost of replacement is reduced.

The nose bar body 30 is formed from substantially identical upper and lower halves 44, 46. The halves 44, 46 are joined together to define a cavity 48 at the body front edge 36 for receiving the wear material insert 42. Preferably, the cavity 48 defines a female dovetail shape for receiving a corresponding male dovetail shaped section of the wear material insert 42. A second cavity 52 formed in the body rear edge 38 is also shaped to receive a male dovetail shaped portion of a second wear material insert. Therefore, in the event that the top surface 32 becomes worn by the chain 13, the nose bar body 30 may be turned over and remounted, providing a renewed top surface 32.

Internally threaded bores 51 formed in each half 44, 46 receive bolts or fasteners for securely joining the two halves 44, 46 together. Of course, other methods for providing internal threads for engaging a bolt or fastener can be used without departing from the scope of the present invention. For example inserts can be molded or pressed into smooth bores formed in each half or an internally threaded bore can be formed in one half and a smooth bore in the other for securing the halves together.

The joined body halves 44, 46 also form a central hollow 54 which receives the support bar 29. The body 30 is mounted to the conveyor frame 14 by sandwiching the support bar 29 in the hollow 54 between the body halves 44, 46. Clamping the support bar 29 in the hollow 54 allows a 180° wrap of the chain 12 around the nose bar 28 which minimizes the thickness of the conveyor frame 14, and allows maximum contact between the chain 12 and the wear material insert 42. Of course, the nose bar body 30 can be mounted to the frame 14 using methods known in the art, such as directly bolting the body 30 to the frame 14, supporting the body 30 with an L bracket 50 such as shown on conveyor section 11, and the like, without departing from the scope of the present invention.

The detachable wear material insert 42 is preferably formed from a low friction, high wear material, such as Nylatron® available from DSM Engineering Plastic Products, Inc. in Reading, Pa. UHMW polyethylene, steel, and the like. The particular material chosen is, of course, dependent upon the intended use, and the properties of the chain.

The insert 42 has one insert edge 56 formed as a male dovetail which can be slipped laterally into the cavity 48 formed in the body 30. An opposing insert edge 58 has a bull nose shape optimized to the chain pitch to support the chain 12 as it passes through the gap 16. Preferably, the insert 42 is formed by extruding the wear material to provide a smooth finish and consistent dimensions in long lengths, however, depending upon the application, other materials such as stainless steel machined to the desired shape can be used.

The movable chain 12 is driven by a drive system (not shown) mounted to the conveyor frame 14. Drive sprockets (not shown) engage the chain 12 to urge it along the frame supporting surface 27. The drive sprocket can be rotatably driven by a motor, or slave driven by an adjacent conveyor section.

In use, the chain 12 is driven by the drive system to slide on the support surface 27, and over the nose bar 28. The sliding chain 12 wears away the wear material insert 42 to a predetermined level. Once the predetermined level is reached, if the wear material is tightly clamped between the body halves 44, 46, the wear material insert 42 can be replaced by loosening the bolts joining the nose bar body halves 44, 46 to unclamp the wear material insert 42. The wear material insert 42 is urged laterally out of the cavity 38, and replaced by a new wear material insert (not shown) which is slipped laterally into the cavity 48. The bolts are then tightened to clamp the new wear material insert between the body halves 44, 46.

Advantageously, the conveyor chain 12 can remain installed on the conveyor frame 14 when replacing the wear material insert 42. Since there is no requirement for positively fastening the insert 42 in the lateral direction, the insert 42 can be held laterally only by friction from the assembled nose bar body 30. This allows an alternate method of replacement by driving the new insert in from the side of the conveyor which urges the used insert out of the opposite side without unfastening or loosening the fasteners or disassembly of the chain.

Figure 4:
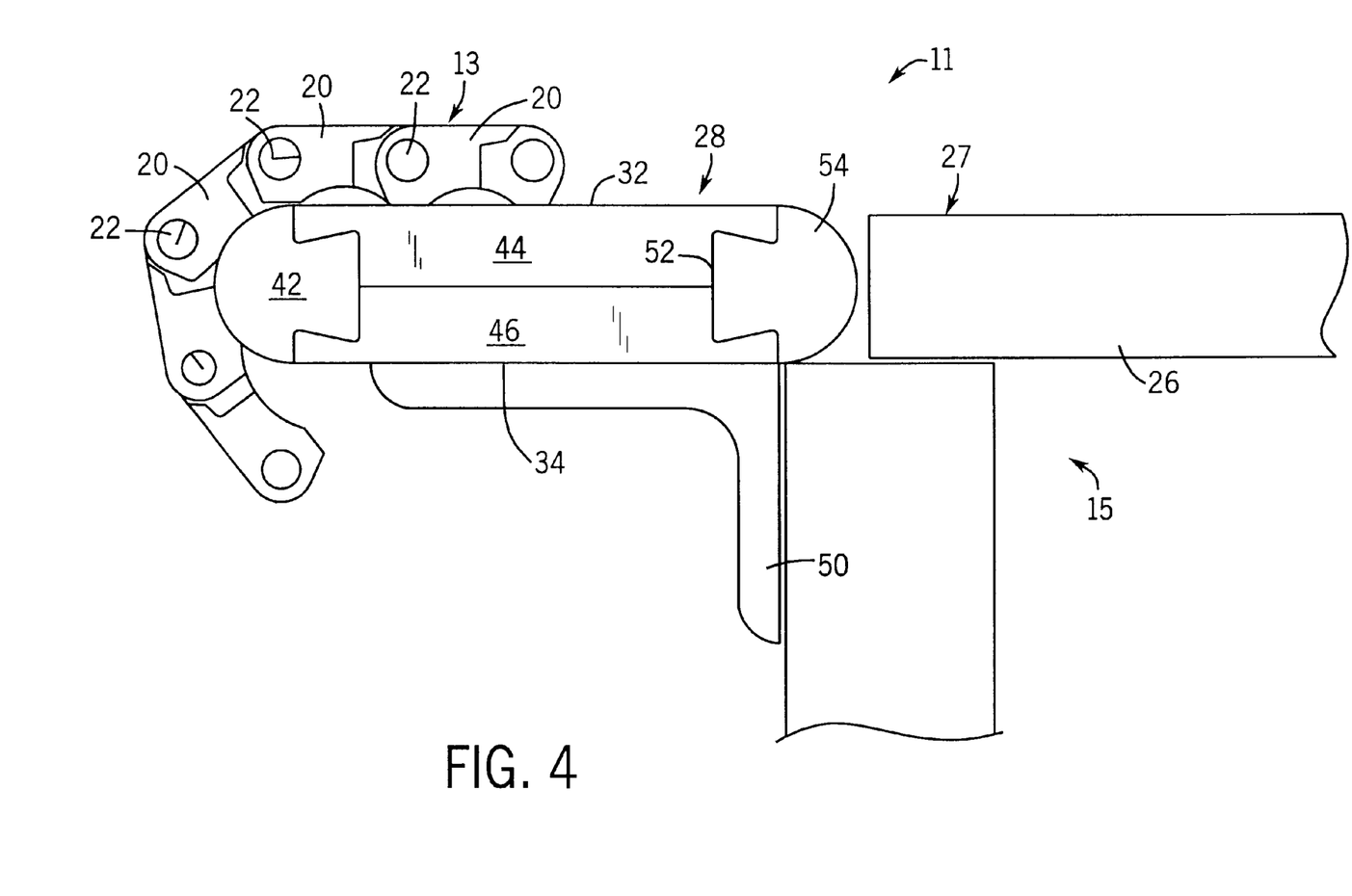
FIG. 4 is a cross sectional view of an alternative embodiment.

In an alternative embodiment shown in FIG. 4, the nose bar 28 is mounted to the conveyor frame 15 using a bracket 50, a second wear material insert 54 is clamped in the rear edge cavity 52 as a spare. When the first wear material insert 42 disposed at the front edge of the nose bar 28 is worn down to a predetermined level, the nose bar 28 is rotated about a lateral axis to engage the second wear material insert 52 with the chain 13. The wear material insert 42, 52 disposed at either edge of the nose bar 28 can be replaced as described for the first embodiment.

Figure 5:
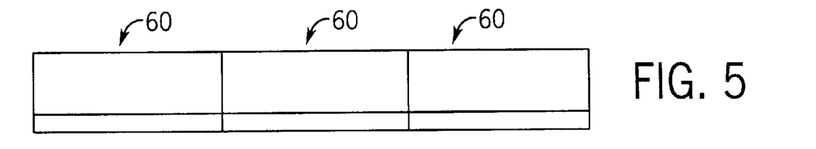
FIGS. 5–11 is a top view of alternative modular embodiments of the present invention.
Figure 6:
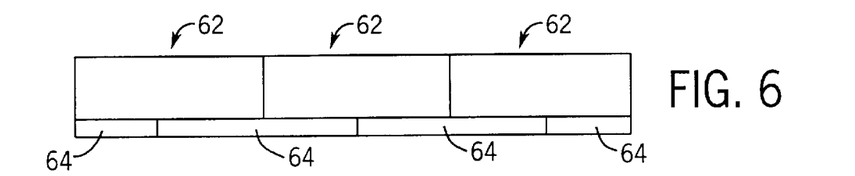
Figure 7:
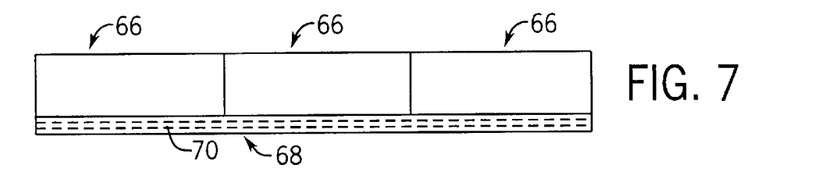
Figure 8:
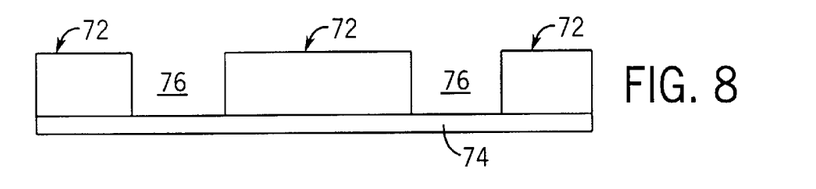
Figure 9:
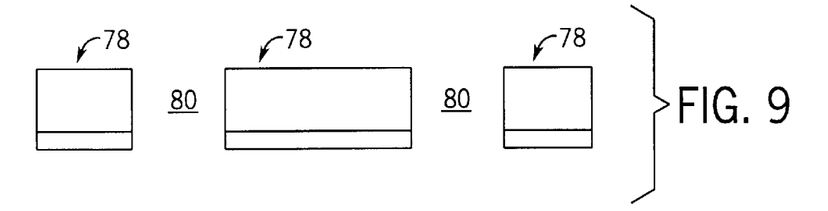
Figure 10:
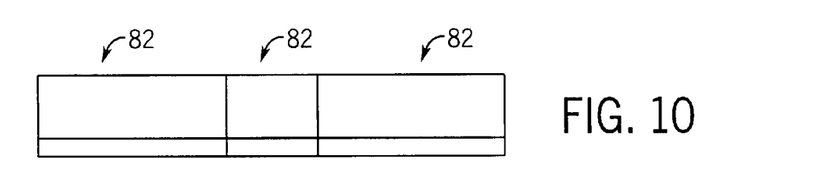
Figure 11:
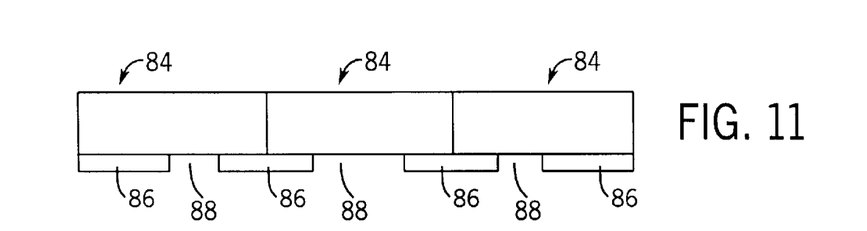

The present invention can be provided as a single continuous nose bar extending laterally across the conveyor width, or in modules which simplifies conveyor design, construction, and maintenance. For example, as shown in FIG. 5, three separate nose bars assemblies 60 are mounted end to end on a conveyor. In FIG. 6, three nose bar bodies 62 are mounted end to end on a conveyor, and wear material inserts 64 are mounted in the bodies 62 in a bricklaying fashion to tie the bodies 62 together. In FIG. 7, three nose bar bodies 66 are mounted end to end on a conveyor, and a single wear material insert 68 is mounted in all three bodies. Advantageously, a passageway 70 can be formed in the wear material insert 68 to provide a coolant path. Coolant, such as water, is pumped through the passageway 70 to maintain the wear material 68 at a desired temperature and reduce wear. In FIG. 8, three nose bar bodies 72 are mounted to a conveyor, and gaps 76 are provided between the nose bar bodies 72. A single wear material insert 74 is mounted in the three bodies 72 to provide a continuous wear surface. In FIG. 9, three nose bar assemblies 78 are mounted to a conveyor, and include gaps 80 between each assembly 78 to accommodate chain portions which pass through the gaps 80. In FIG. 10, three nose bar assemblies 82 are mounted end to end on a conveyor. The assemblies 82 have different widths to customize the overall width of the resultant nose bar. Finally, as shown in FIG. 11, three nose bar bodies 84 are mounted end to end on a conveyor. Wear material inserts 86 are mounted in the bodies 84, and gaps 88 between each insert 86 accommodate chain portions which pass through the gaps 88, or to reduce the wear surface area.

While there has been shown and described what are at present considered the preferred embodiment of the invention, it will be obvious to those skilled in the art that various changes and modifications can be made therein without departing from the scope of the invention.

We claim:

1. A nose bar for mounting to an end of a conveyor, said nose bar comprising:
   an elongated body for mounting to a conveyor frame, said body having opposing front and rear edges joined by a top surface and bottom surface;
   an insert mounted to said front edge, and having a wear material for engaging a conveyor chain slidably supported by the conveyor frame as the chain wraps around said front edge, wherein slidable movement of said chain wears away said wear material; and
   at least one coolant passage formed in said insert.

2. A conveyor comprising:
   a conveyor frame for supporting a chain for slidable movement thereon, and having an end;
   a nose bar mounted to said conveyor end, said nose bar including a body having a rear edge and extending away from the conveyor end to define a front edge;
   a chain slidably supported by said frame and wrapping around said front edge; and
   an insert mounted to said front edge, and said insert having a wear material slidably engaging said chain; and
   a second insert mounted to said rear edge.

3. The conveyor of claim 2, in which said nose bar includes a body, and said insert is detachably mounted to said body.

4. The conveyor of claim 2, in which said insert includes wear material selected from the group consisting of Nylatron®, UHMW polyethylene, and steel.

5. The conveyor of claim 2, including a bracket attached to said body for mounting to said conveyor frame.

6. The conveyor of claim 2, in which said nose bar includes one or more bodies mounted to said conveyor end, and at least one insert is mounted to at least one of said bodies.

7. The conveyor chain of claim 2, in which said insert includes a coolant passage formed therein for cooling said insert.

8. A nose bar for mounting to an end of a conveyor, said nose bar comprising:
   an elongated body for mounting to a conveyor frame, said body having opposing front and rear edges joined by a top surface and bottom surface;
   a detachable insert mounted to said front edge, and having a wear material for engaging a conveyor chain slidably supported by the conveyor frame as the chain wraps around said front edge, wherein slidable movement of said chain wears away said wear material; and
   a cavity formed in said front edge, and said insert is mounted in said cavity.

9. The nose bar of claim 8, in which said cavity has a female dove tail shape, and a portion of said insert has a male dovetail shape which fits in said cavity.

10. The nose bar of claim 8, including a bracket attached to said body for mounting to the conveyor frame.

11. A conveyor comprising:
    a conveyor frame for supporting a chain for slidable movement thereon, and having an end;
    a nose bar mounted to said conveyor end, said nose bar extending away from the conveyor end to define a front edge;
    a chain slidably supported by said frame and wrapping around said front edge; and
    an insert mounted to said front edge, and said insert having a wear material slidably engaging said chain; and
    a coolant passage formed in said insert for cooling said insert.

12. The conveyor of claim 11, including a bracket attached to said nose bar for mounting to said conveyor frame.

13. The conveyor of claim 11, in which said nose bar includes a body, and said insert is detachably mounted to said body.

14. The conveyor of claim 11, in which said insert includes wear material selected from the group consisting of Nylatron®, UHMW polyethylene, and steel.

15. The conveyor of claim 11, in which said nose bar includes one or more bodies mounted to said conveyor end, and at least one insert is mounted to at least one of said bodies.

16. A nose bar for mounting to an end of a conveyor, said nose bar comprising:
    an elongated body for mounting to a conveyor frame, said body having opposing front and rear edges joined by a top surface and bottom surface;
    a detachable insert mounted to said front edge, and having a wear material for engaging a conveyor chain slidably supported by the conveyor frame as the chain wraps around said front edge, wherein slidable movement of said chain wears away said wear material; and in which said body is formed from two halves, and said insert is mounted to said body by sandwiching a portion of said insert between said body halves.

17. The nose bar of claim 16, including a bracket attached to said body for mounted to the conveyor frame.

18. A nose bar for mounting to an end of a conveyor, said nose bar comprising:
    an elongated body for mounting to a conveyor frame, said body having opposing front and rear edges joined by a top surface and bottom surface;

a detachable insert mounted to said front edge, and having a wear material for engaging a conveyor chain slidably supported by the conveyor frame as the chain wraps around said front edge, wherein slidable movement of said chain wears away said wear material; and, in which said body is formed from two halves, and said body is mounted to a conveyor by sandwiching a portion of said conveyor between said body halves.

19. The nose bar of claim 18, in which said insert is detachable from said body.

20. A conveyor comprising:
 a conveyor frame for supporting a chain for slidable movement thereon, and having an end;
 a nose bar mounted to said conveyor end, said nose bar extending away from the conveyor end to define a front edge;
 a chain slidably supported by said frame and wrapping around said front edge;
 an insert mounted to said front edge, and said insert having a wear material slidably engaging said chain; and
 a cavity formed in said front edge, and said insert is mounted in said cavity.

21. The conveyor of claim 20, in which said nose bar includes a body, and said insert is detachably mounted to said nose bar.

22. The conveyor of claim 20, in which said insert includes wear material selected from the group consisting of Nylatron®, UHMW polyethylene, and steel.

23. The conveyor of claim 20, in which said nose bar includes one or more bodies mounted to said conveyor end, and at least one insert is mounted to at least one of said bodies.

24. The conveyor of claim 20, including a bracket attached to said nose bar for mounting to said conveyor frame.

25. A conveyor comprising:
 a conveyor frame for supporting a chain for slidable movement thereon, and having an end;
 a nose bar mounted to said conveyor end, said nose bar extending away from the conveyor end to define a front edge;
 a chain slidably supported by said frame and wrapping around said front edge; and
 an insert mounted to said front edge, and said insert having a wear material slidably engaging said chain, in which said nose bar includes a body formed from two halves, and said insert is mounted to said body by sandwiching a portion of said insert between said body halves.

26. The conveyor of claim 25, in which said insert includes wear material selected from the group consisting of Nylatron®, UHMW polyethylene, and steel.

27. The conveyor of claim 25, in which said nose bar includes one or more bodies mounted to said conveyor end, and at least one insert is mounted to at least one of said bodies.

28. The conveyor of claim 25, including a bracket attached to said body for mounting to said conveyor frame.

29. The conveyor of claim 25, in which said insert is detachably mounted to said body.

30. A conveyor comprising:
 a conveyor frame for supporting a chain for slidable movement thereon, and having an end;
 a nose bar mounted to said conveyor end, said nose bar extending away from the conveyor end to define a front edge;
 a chain slidably supported by said frame and wrapping around said front edge; and
 an insert mounted to said front edge, and said insert having a wear material slidably engaging said chain, in which said nose bar includes a body formed from two halves, and said body is mounted to said conveyor frame by sandwiching a portion of said conveyor frame between said body halves.

31. The conveyor of claim 30, in which said insert is detachably mounted to said body.

32. The conveyor chain of claim 30, in which said insert includes wear material selected from the group consisting of Nylatron®, UHMW polyethylene, and steel.

33. The conveyor chain of claim 12, in which said nose bar includes one or more bodies mounted to said conveyor end, and at least one insert is mounted to at least one of said bodies.

34. A nose bar for mounting to an end of a conveyor, said nose bar comprising:
 an elongated body for mounting to a conveyor frame, said body having opposing front and rear edges joined by a top surface and bottom surface;
 a detachable insert mounted to said front edge, and having a wear material for engaging a conveyor chain slidably supported by the conveyor frame as the chain wraps around said front edge, wherein slidable movement of said chain wears away said wear material; and
 a second insert mounted to said rear edge.

35. The nose bar of claim 34, including a bracket attached to said body for mounting to the conveyor frame.

* * * * *

UNITED STATES PATENT AND TRADEMARK OFFICE
CERTIFICATE OF CORRECTION

PATENT NO. : 6,367,619 B1  Page 1 of 1
DATED : April 9, 2002
INVENTOR(S) : Cemke, Jr. et al.

It is certified that error appears in the above-identified patent and that said Letters Patent is hereby corrected as shown below:

<u>Column 6,</u>
Line 62, "mounted" should read -- mounting --

<u>Column 8,</u>
Line 33, "claim 12" should be -- claim 30 --

Signed and Sealed this

Tenth Day of September, 2002

*Attest:*

*Attesting Officer*

JAMES E. ROGAN
*Director of the United States Patent and Trademark Office*